United States Patent [19]

Kaltenthaler et al.

[11] 3,717,072
[45] Feb. 20, 1973

[54] BRAKE CYLINDER FOR VEHICLES
[75] Inventors: Wolfgang Kaltenthaler, Hannover; Horst Mylius, Garbsen, both of Germany
[73] Assignee: Westinghouse Bremsen-und Apparatebau, GmbH, Hannover, Germany
[22] Filed: Dec. 21, 1970
[21] Appl. No.: 100,185

[30] Foreign Application Priority Data
Nov. 12, 1970  Germany.....................P 20 00 369.4

[52] U.S. Cl. .......................................92/152, 92/63
[51] Int. Cl. ..................................................F01b 7/00
[58] Field of Search............92/152, 107, 108, 109, 63

[56] References Cited
UNITED STATES PATENTS 3,335,642  8/1967  Rosaen.............................92/165 R
3,112,959  12/1963  Kateley.................................92/63
3,291,004  12/1966  Stevenson............................92/63
3,176,870  4/1965  Cruse...................................92/63

FOREIGN PATENTS OR APPLICATIONS 163,735  11/1933  Switzerland........................92/152

Primary Examiner—Milton Kaufman
Assistant Examiner—Ronald H. Lazarus
Attorney—Ralph W. McIntire, Jr.

[57]  ABSTRACT

A brake cylinder device of the spring actuated and fluid pressure released type characterized by a compound piston having a smaller cylinder and piston nested within a cup-like central portion of a larger piston, all being disposed within an outer cylinder casing of dimensions equivalent to those of the cylinder casing of a conventional single-piston brake cylinder.

6 Claims, 1 Drawing Figure

PATENTED FEB 20 1973
3,717,072
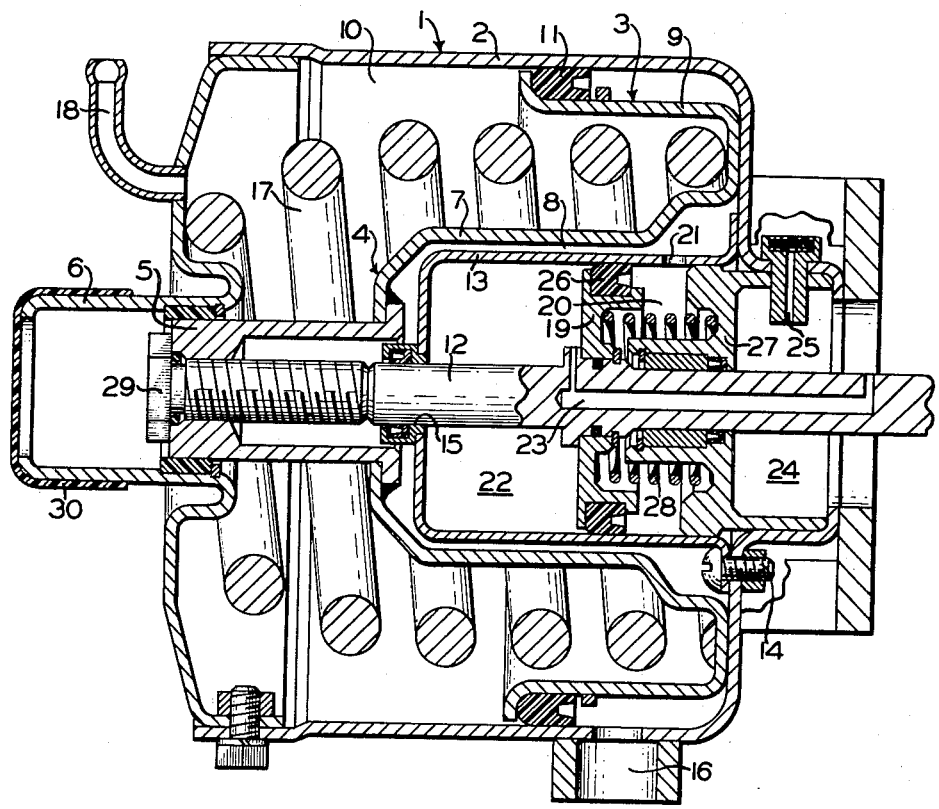
INVENTOR.
WOLFGANG KALTENTHALER
HORST MYLIUS
BY
Ralph W. McIntire, Jr.
ATTORNEY

BRAKE CYLINDER FOR VEHICLES

BACKGROUND OF INVENTION

With continual improvement of brake apparatus, compactness and simplicity of the equipment becomes highly important, not only for reducing manufacturing, installation and maintenance costs, but also for increasing the efficiency of the equipment. An example of such an improvement is the truck-mounted brake apparatus for railway vehicles wherein the braking units, including the cylinders and levers therefor, are mounted entirely within the confines of the wheel truck, thereby eliminating the necessity of bulky, complicated, less efficient brake rigging extending from one end of the car to the other as was the case in prior braking apparatus. With the advent of improved braking apparatus, therefore, conservation of space required by the several components of the apparatus is highly desirable.

SUMMARY OF INVENTION

The object of the present invention, therefore, is to provide a compact brake cylinder device capable of delivering a higher degree of brake applying force yet requiring no more space for installation than presently known brake cylinder devices of lesser capacity.

Briefly the invention comprises a spring applied and fluid pressure released brake cylinder device characterized by a compound piston arrangement wherein a smaller piston and a larger hollow piston are coaxially mounted on a common piston rod with the smaller piston being operably disposed within an inner cylinder which, in turn, is nested within a cup-like central portion of the larger piston, thus providing a combined pressure area greater than that of a single piston in a conventional brake cylinder and on which combined area fluid pressure may be applied for releasing the brakes, and thereby making it possible to use a larger spring capable of delivering a greater application force on the brakes while maintaining the overall external dimensions of the improved brake cylinder device equivalent to those of the conventional brake cylinder. Fluid pressure for acting on the pressure areas of both the larger and smaller pistons is admitted through a common inlet port.

The single FIGURE drawing is an elevational view, in section, of a brake cylinder device embodying the invention.

DESCRIPTION AND OPERATION

As shown, a brake cylinder device 1 comprises an outer cylinder casing 2 in which a compound piston assemblage 3 is coaxially disposed. The piston assemblage 3 comprises a hollow main piston 4 having at its left-hand end, as viewed in the drawing, an axially aligned guide member 5 coaxially slidably supported in a suitable bearing fixed in a cup-like extension 6 formed at the adjacent end of the casing 2 for accommodating axial displacement of said guide member during axial displacement of the piston assemblage in a left-hand direction. The right-hand end of main piston 4, as viewed in the drawing, comprises a cup-like central portion 7 wherein a main pressure chamber 8 is closed at one end by the guide member 5 and at its opposite end by the right-hand end wall of cylinder casing 2. Main piston 4 is also provided with an annular trough 9 of substantially U-shaped cross section externally surrounding said main piston at the right-hand end thereof with the closed end of the trough at said right-hand end and the open end opening into a main spring chamber 10 formed cooperatively by the casing 2 and said main piston. An annular sealing gasket 11 disposed externally of the trough portion 9 of the main piston 4 makes sliding sealing contact with the inner surface of cylinder casing 2 to prevent leakage of fluid pressure from pressure chamber 8 to spring chamber 10.

The piston assemblage 3 further comprises a piston rod 12 extending coaxially through the cylinder device 1, one end of said piston rod being screw-threadedly secured in the guide member 5 and the opposite end thereof extending beyond the limits of cylinder casing 2 so as to be operably connected to brake shoes or discs which are not shown.

An inner cylinder casing 13, coaxially disposed within the cup-like portion 7 of main piston 4, has one end secured to the right-hand end wall of cylinder casing 2 in a fixed position relative thereto by suitable means such as a plurality of bolts 14, for example, only one of which is shown. The other end of cylinder casing 13 is provided with a coaxial opening 15 through which piston rod 11 is slidably sealingly movable. Inner cylinder casing 13 is of such dimension and which, in cooperation with guide member 5, cup-like portion 7 of main cylinder 4 and the right-hand end wall of outer cylinder casing 2, provides an annular space between the external surface of said inner cylinder casing and the internal surface of said cup-like portion to form the main pressure chamber 8, above noted. Cylinder casing 2 is provided with a fluid pressure port 16 via which fluid under pressure may be supplied to or released from main pressure chamber 8.

A main spring 17 disposed in spring chamber 10 is compressed between the closed end or bottom of trough 9 of main piston 4 and the left-hand end wall of cylinder casing 2 for urging axial movement of piston assemblage 3 in a right-hand direction, as viewed in the drawing, toward an application position in which it is shown and in which piston rod 12 applies an application force to the brake shoes (not shown) for effecting a brake application. Spring chamber 10 is vented to atmosphere via a vent 18.

The piston assemblage 3 further comprises an auxiliary piston 19 operably disposed within the inner cylinder casing 13 and secured on piston rod 12 in axially spaced-apart relation to main piston 4. Auxiliary piston 19 divides the cylinder casing 13 into an auxiliary pressure chamber 20, which is in communication with main pressure chamber via an opening 21, and an exhaust chamber 22, which is communicated to atmosphere via a passageway 23 extending axially through piston rod 12 with one end opening into said exhaust chamber and the other end opening to an atmospheric chamber 24. Atmospheric chamber 24 is provided with a filtered vent port 25 for preventing dirt and other foreign material from being drawn into exhaust chamber 22 during movement of auxiliary piston 19 in a right-hand direction, as viewed in the drawing, relative to main piston 4, as will hereinafter be explained. Auxiliary piston 19 is also provided with a sealing gasket 26 to provide slidably sealing contact with the inner surface of cylinder casing 13 and thereby prevent leakage of fluid pressure from auxiliary pressure chamber 20 to exhaust chamber 22. The end of piston rod 12, which extends beyond the limits of cylinder casing 2, is sealingly slidably supported in a bearing member 27 which also serves to close the end of auxiliary pressure chamber 20 opposite auxiliary piston 19.

An auxiliary spring 28 disposed in auxiliary pressure chamber 20 is compressed between the bearing member 27 and auxiliary piston 19 to thereby assist in operating the piston assemblage 3 to a brake release position, which will hereinafter be described.

In operation, when main pressure chamber 8 and auxiliary pressure chamber 20 are free of fluid pressure, main spring 17 is effective for axially moving piston assemblage 3 in a right hand direction for operating said piston assemblage to its brake application position. Since auxiliary piston 19 is fixed to piston rod 12, right-hand movement of piston assemblage 3 and, therefore, of said piston rod causes auxiliary spring 28, which is of a substantially lesser compression rating than main spring 4, to be compressed and therefore to some degree oppose such movement of the piston assemblage.

To effect release of the brake application, fluid at a selected degree of pressure is admitted, through port 16, into main pressure chamber 8 and via opening 21 into auxiliary pressure chamber 20. Fluid pressure thus acting on main piston 4 and on auxiliary piston 19, assisted by the compressed auxiliary spring 28, acts in opposing relation to the effect of main spring 17 for causing left-hand movement of piston assemblage 3 and, therefore, operation thereof to its brake release position, assuming the degree of such fluid pressure to be sufficient for overcoming the effect of said main spring.

It should be apparent that in the total absence of fluid pressure in chambers 8 and 20, spring 17 is effective for effecting a maximum brake application, which brake application can be reduced by degrees or completely released according to the selected degree of fluid pressure supplied to said pressure chambers. It should also be apparent that with the novel arrangement herein disclosed, that is, a compound piston, one nested within the other, a much larger pressure area is provided within the dimensional limits equivalent to those of a conventional brake cylinder, and on which pressure area fluid pressure may act in opposition to the brake applying force exerted by main spring 17. As a result of such an arrangement, the main spring 17 may accordingly be increased to provide a greater brake applying force as compared to a conventional single-piston brake cylinder of the same outer dimensions.

As above described, the piston assemblage 3 normally operates as a unit since both pistons 4 and 19 are secured to the piston rod 12 in a fixed axial relationship. As further noted above, main spring 17 maintains the brakes in an applied state until pistons 4 and 19 are subjected to sufficient fluid pressure for effecting a release of the application. In the event that a failure in fluid pressure supply should occur, the brakes, of course, would remain applied, unless some means is provided whereby the brakes can be released under such circumstances. To meet such a contingency, the screw-threaded end of piston rod 12 has formed at the extremity thereof a hex head 29 which is accessible by removing a cover member 30 from the extending portion 6 of cylinder casing 2. By turning the hex head 29 in the proper direction, piston rod 12 can thus be retracted in a left-hand direction, as viewed in the drawing, thereby effecting a manual release of the brake application with auxiliary spring 28 assisting in such manual operation by acting through piston 19 to bias said piston rod toward said left-hand direction. Piston rod 12 is restored to its normal position in the piston assemblage 3 by the hex head 29 if it is desired to reapply the brakes or when normal fluid pressure supply is again available.

Having now described the invention what we claim as new and desire to secure by Letters Patent, is:

1. A brake cylinder device comprising:
   a. an outer cylinder casing;
   b. a piston assemblage coaxially operably disposed in said outer cylinder casing; and
   c. spring means for exerting a first force on said piston assemblage for effecting axial movement thereof in one direction toward one position;
   d. said piston assemblage comprising a pair of pistons of respective different sizes mounted on a common piston rod in axially spaced-apart relationship and having respective pressure areas on corresponding sides thereof adjacent respective pressure chambers being chargeable with fluid pressure, the opposite sides of said pistons being disposed adjacent respective atmospheric chambers, said pressure areas being subjectable to fluid pressure in said chambers and being effective when such pressure exceeds a predetermined degree for cumulatively providing a combined force greater than said first force for effecting axial move-ment of the piston assemblage in a direction opposite to said one direction toward a different position, the larger of said pair of pistons being reciprocably operable within said outer cylinder casing and having a concentric cup-like portion in which an inner cylinder casing is concentrically accommodated in fixed relation to the outer cylinder casing, the smaller of said pair of pistons being reciprocably operable within said inner cylinder casing.

2. A brake cylinder device, as set forth in claim 1, wherein said pressure chambers comprise an auxiliary pressure chamber formed in said inner cylinder casing and a main pressure chamber, the external diametral dimension of said inner cylinder casing being such relative to the internal diametral dimension of said cup-like portion as to form said main pressure chamber therebetween.

3. A brake cylinder device, as set forth in claim 2, further characterized by passage means interconnecting said pressure chambers and a common fluid pressure supply port via which said chambers may be charged simultaneously.

4. A brake cylinder device, as set forth in claim 1, wherein one end wall of the outer cylinder casing and one end wall of the inner cylinder casing lie in a common plane perpendicular to the axis of the brake cylinder device at one end thereof.

5. A brake cylinder device, as set forth in claim 1, further characterized by manually operable means for effecting axial movement of said piston rod and said smaller piston in a direction coinciding with said opposite direction of said piston assemblage and to a position coinciding with said different position of the piston assemblage.

6. A brake cylinder device, as set forth in claim 1, wherein said pressure chambers are sealingly isolated from said atmospheric chambers, respectively.

* * * * *